(12) United States Patent
Shinpo et al.

(10) Patent No.: US 6,404,165 B1
(45) Date of Patent: Jun. 11, 2002

(54) ELECTRICITY ACCUMULATOR

(75) Inventors: Toshiya Shinpo, Nisshin; Hiroyasu Suzuki, Nagoya, both of (JP)

(73) Assignee: Mitsubishi Jidosha Kogyo, Tokyo (JP)

( * ) Notice: Subject to any disclaimer, the term of this patent is extended or adjusted under 35 U.S.C. 154(b) by 0 days.

(21) Appl. No.: 09/161,455

(22) Filed: Sep. 28, 1998

(30) Foreign Application Priority Data

Sep. 29, 1997 (JP) ............................................. 9-263879

(51) Int. Cl.[7] .................................................. H02J 7/00
(52) U.S. Cl. ........................ 320/116; 320/124; 307/10.7
(58) Field of Search ................................. 320/116, 118, 320/124; 307/10.7

(56) References Cited

U.S. PATENT DOCUMENTS

| | | | | |
|---|---|---|---|---|
| 4,056,764 A | * | 11/1977 | Endo et al. ................... | 320/101 |
| 4,547,629 A | * | 10/1985 | Corless ........................ | 379/412 |
| 5,537,390 A | * | 7/1996 | Horiba et al. ................ | 320/134 |
| 5,606,240 A | * | 2/1997 | Kokuga et al. .............. | 320/129 |
| 5,710,504 A | | 1/1998 | Pascual et al. | |
| 5,932,932 A | * | 8/1999 | Agatsuma et al. ......... | 307/10.6 |

FOREIGN PATENT DOCUMENTS

| | | |
|---|---|---|
| DE | WO/9604564 | 2/1996 |
| FR | 2724501 A1 | 3/1996 |
| JP | 6319287 | 11/1994 |

* cited by examiner

*Primary Examiner*—Peter S. Wong
*Assistant Examiner*—Gregory J Toatley, Jr.

(57) ABSTRACT

An electricity accumulator which is capable of equalizing the voltages of a plurality of electricity accumulating devices such as batteries in an inexpensive and simple construction and quickly even in a state which is not a fully charged state. Dissipation of electrical energy is prevented. The electricity device includes a plurality connected in series. There is a capacitor connectable in parallel with at least two of the electricity accumulating devices. A connection switching device switches selectively a first connection mode in which the capacitor is connected to a first electricity accumulating device so that the capacitor is charged or discharged through the first electricity accumulating device and a second connection mode in which the capacitor is connected to a second electricity accumulating device.

13 Claims, 4 Drawing Sheets

ELECTRICITY ACCUMULATOR

BACKGROUND OF THE INVENTION

1. Field of the Invention

The present invention relates generally to an electricity accumulator formed as a storage battery comprising a large number of battery cells connected in series, and more particularly to an electricity accumulator suitable for use in electric automobiles.

2. Description of Background Art

Techniques have recently been developed for an enhancement in the practical use of electric automobiles, and as the present power supply for electric automobiles, a storage battery comprising a large number of battery cells connected in series has been used.

In the case of such a storage battery comprising a large number of battery cells connected in series, the output of the storage battery depends upon the battery cell whose voltage is lowest, so the storage battery cannot use all the battery cells equally and exhibit the capability of each battery cell maximally.

Incidentally, as in a lithium-ion battery cell, in a battery cell in which its output voltage is determined in dependence on its discharge amount (see FIG. 4), the discharge amounts of all battery cells (conversely speaking, charge amounts or residual capacities) can be equalized with one another by equalizing the voltages of all battery cells. Therefore, if charging or discharging is performed so that the voltages of all battery cells become equal to one another, the storage battery can exhibit the capability of each battery cell maximally.

Hence, a voltage equalizing circuit for a storage battery has been provided, and it is constructed as shown in FIG. 5.

The circuit shown in FIG. 5 is a voltage equalizing circuit corresponding to one battery cell (or one module) of a storage battery, and therefore, the same circuit is provided in each battery cell.

In such a circuit, a charging operation is first performed and then a discharging operation is performed at the end of the charging operation.

That is, the terminal voltage of a battery cell 101 is raised by the charging operation. This raised state is monitored by a voltage monitoring circuit (voltage detection circuit) 104, and if the voltage VB across both terminals of the battery cell 101 exceeds a set voltage, a discharging switch 102 will be caused to be in an ON state (closed state).

With the above operation, current conduction to a discharging resistor 103 is performed, whereby electric energy is converted to heat and dissipated. With this dissipation, if the cell voltage VB becomes equal to or less than the set voltage, the discharging switch 102 will be caused to be in an OFF state (open state).

By reiterating such on-off control of the discharging switch 102, the voltage VB of the battery cell is adjusted to the set voltage.

Note that in the actual circuit of the voltage equalizing circuit, instead of the discharging switch 102 a power device such as a power transistor is generally used to adjust voltage by linear control rather than by on-off control.

The aforementioned conventional electricity accumulator, however, have the following disadvantages.

That is, in the above-mentioned circuit, the energy exceeding a set voltage is dissipated in the form of heat by the discharging resistor 103. For this reason, there are significant problems that power loss becomes great and that a countermeasure to radiate heat has to be considered.

In addition, the voltage equalization is possible only when the cell voltage VB at the end of the charging operation rises, and therefore, there is a problem that the voltage equalization can not be performed during discharge or for a vacant time during which a vehicle is not in use.

The aforementioned conventional electricity accumulator, therefore, cannot be utilized in electric automobiles that are not charged to its full charge during travel while generating electrical energy, as in hybrid electric automobiles.

Furthermore, since large-capacity components, such as a discharge resistor, a heat radiating plate, and a switching element, must be used, the overall device size is increased and a cooling unit for heat radiation is required, so that there is also a problem that the entire device becomes structurally complicated.

Hence, an equalizing circuit which is not required of a discharging method is necessary, and as the example, a technique disclosed in Japanese Laid-Open Patent Application No. HEI 6-319287 has been proposed.

In the aforementioned technique, both ends of a storage battery comprising a large number of battery cells connected in series are connected to a capacitor so that all battery cells are uniformly charged. However, a capacitor with a large capacitance is required and the control of detecting the terminal voltage of each battery cell and selecting a battery cell to be charged is logically complicated.

Hence, it is conceivable that a plurality of capacitors corresponding in number to battery cells connected in series are provided. And a first connection mode in which all capacitors are respectively connected in parallel with the corresponding battery cells and a second connection mode in which the capacitors are respectively connected in parallel with the battery cells adjacent to the corresponding battery cells are alternately switched, whereby the voltages of all battery cells are equalized with one another.

In the above case, the voltage equalization between battery cells is performed by moving electric charge between battery cells through capacitors.

However, in the aforementioned constitution, since electric charge is moved only between adjacent battery cells, there is a problem that the time required for voltage equalization is increased as the number of battery cells is increased. Also, as each battery cell requires a capacitor, the voltage equalizing circuit is increased in size, so that there is also a problem that the production cost is increased.

For the storage battery constituted by a plurality of battery cells connected in series, the aforementioned Japanese Laid-Open Patent Publication No. HEI 6-319287 discloses a technique in which a battery cell to be charged is selected, while the terminal voltage of each battery cell and the voltage of a capacitor are being monitored in performing a charging operation by the capacitor charged by regenerative current.

In the above technique, some of a plurality of battery cells are selected and charged so that the sum total of the terminal voltages of the selected battery cells becomes lower than the capacitor voltage. With this, even if the capacitor voltage were reduced, charging can be performed, and by charging a battery cell whose terminal voltage is low, a plurality of battery cells are uniformly charged.

Although the aforementioned technique can equalize the voltages of all battery cells in charging the storage battery, it cannot perform the voltage equalization except during charge.

SUMMARY OF THE INVENTION

The present invention has been made in view of the above-mentioned problems. Accordingly, it is an object of the invention to provide an electricity accumulator which is capable of equalizing the voltages of a plurality of electricity accumulating means with inexpensive and simple constitution and quickly even in a state which is not a fully charged state, while preventing dissipation of electrical energy.

To achieve this end and in accordance with one aspect of the present invention, there is provided an electricity accumulator comprising: a plurality of electricity accumulating means connected in series; a capacitor connectable in parallel with at least two of the plurality of electricity accumulating means; and connection switching means to switch selectively a first connection mode in which the capacitor is connected to first electricity accumulating means of the plurality of electricity accumulating means so that the capacitor is charged or discharged through the first electricity accumulating means and a second connection mode in which the capacitor is connected to second electricity accumulating means differing from the first electricity accumulating means so that the capacitor is charged or discharged through the second electricity accumulating means; wherein the switch of the first and second connection modes by the connection switching means is reiteratedly performed.

With such constitution, if the switch of the first and second connection modes is reiteratedly performed by the connection switching means, voltage equalization will be performed between the first and second electricity accumulating means through the capacitor and therefore the differential voltage between the first and second electricity accumulating means will not be dissipated as power consumption through radiation of heat, so that there will be an advantage that voltage equalization can be performed, while power loss is being suppressed. For this reason, the storage battery can exhibit its capability efficiently. Also, the additional advantage that a measure to counter radiation of heat can be alleviated by a reduction in the loss of heat radiation is obtainable. Of course there is an advantage that voltage equalization can be performed regardless of operating states such as traveling, charging, discharging, etc.

In accordance with another aspect of the present invention, there is provided an electricity accumulator comprising: a plurality of electricity accumulating means connected in series; a capacitor connectable in parallel with each of the plurality of electricity accumulating means; voltage monitoring means to monitor respective voltages of the plurality of electricity accumulating means; and connection switching means to select two electricity accumulating means from among the plurality of electricity accumulating means in accordance with the voltages detected by the voltage monitoring means and then to switch selectively a first connection mode in which the capacitor is connected to first electricity accumulating means of the two electricity accumulating means so that the capacitor is charged or discharged through the first electricity accumulating means and a second connection mode in which the capacitor is connected to second electricity accumulating means differing from the first electricity accumulating means so that the capacitor is charged or discharged through the second electricity accumulating means; wherein the switch of the first and second connection modes by the connection switching means is reiteratedly performed.

With such constitution, if the switch of the first and second connection modes is reiteratedly performed by the connection switching means, voltage equalization will be performed between the first and second electricity accumulating means selected according to the voltages detected by the voltage monitoring means through the capacitor. Therefore, according to a voltage state, electricity accumulating means in which a request of voltage equalization is high is selected, whereby voltage equalization can be quickly performed. For this reason, the storage battery can exhibit its capability efficiently. Of course, the differential voltage between the first and second electricity accumulating means will not be dissipated as power consumption through radiation of heat, and there is an advantage that voltage equalization can be performed, while power loss is being suppressed. Also, the additional advantage that a measure to counter radiation of heat can be alleviated by a reduction in the loss of heat radiation is obtainable. Furthermore, there is an advantage that voltage equalization can be performed regardless of operating states such as traveling, charging, discharging, etc.

In a preferred form of the present invention, two electricity accumulating means in which a voltage difference therebetween is large are selected as the first and second electricity accumulating means by the connection switching means in accordance with the voltages detected by the voltage monitoring means.

In accordance with still another aspect of the present invention, there is provided an electricity accumulator comprising: a plurality of electricity accumulating means connected in series; selection means to partition the plurality of electricity accumulating means to into a plurality of electricity accumulating blocks and select two electricity accumulating blocks from among the plurality of electricity accumulating blocks, each electricity accumulating block being constituted by one electricity accumulating means or a plurality of electricity accumulating means; a capacitor provided so that it is connectable in parallel with an arbitrary block of the plurality of electricity accumulating blocks; and connection switching means to switch selectively a first connection mode in which the capacitor is connected to a first electricity accumulating block of the two electricity accumulating blocks selected by the selection means so that part of the electric power of the first electricity accumulating block is transferred to the capacitor and a second connection mode in which the capacitor is connected to a second electricity accumulating block differing from the first electricity accumulating block so that the second electricity accumulating block is charged; wherein the selection of the two electricity accumulating blocks by the selection means and the switch of the first and second connection modes by the connection switching means are reiteratedly performed.

With such constitution, if the switch of the first and second connection modes is reiteratedly performed by the connection switching means, voltage equalization will be performed between the first and second electricity accumulating blocks selected according to the voltages by the voltage monitoring means through the capacitor. Therefore, according to a voltage state, electricity accumulating blocks in which a request of voltage equalization is high is selected, whereby voltage equalization can be quickly performed. For this reason, the storage battery can exhibit its capability efficiently. The differential voltage between the first and second electricity accumulating block will not be dissipated as power consumption through radiation of heat, so that there is an advantage that voltage equalization can be performed, while power loss is being suppressed. Also, the additional advantage that a measure to counter radiation of heat can be alleviated by a reduction in the loss of heat radiation is obtainable. Furthermore, there is an advantage that voltage equalization can be performed regardless of operating states such as traveling, charging, discharging, etc.

In a preferred form of the present invention, the capacitor is connectable in parallel with all electricity accumulating means of the electricity accumulating block which becomes an object of selection, selected by the selection means.

In another preferred form of the present invention, the selection means has voltage monitoring means to monitor respective voltages of the plurality of electricity accumulating means and, based on the voltages detected by the voltage monitoring means, the selection means sets the plurality of electricity accumulating blocks and also selects two electricity accumulating blocks from among the set plurality of electricity accumulating blocks.

In still another preferred form of the present invention, the selection means has voltage monitoring means to monitor respective voltages of the plurality of electricity accumulating means and sets, as a single electricity accumulating block, single electricity accumulating means in which the voltage detected by the voltage monitoring means is in a predetermined state.

In a further preferred form of the present invention, electricity accumulating means in which the voltage detected by the voltage monitoring means is in a highest voltage state is set as the first electricity accumulating block from among the plurality of electricity accumulating means by the selection means.

In a further preferred form of the present invention, electricity accumulating means in which the voltage detected by the voltage monitoring means is in a lowest voltage state is set as the first electricity accumulating block from among the plurality of electricity accumulating means by the selection means.

The selection means may set as a single electricity accumulating block a plurality of electricity accumulating means in which the voltages detected by the voltage monitoring means are within a predetermined range.

In this case, the selection means may compute a mean voltage value of the voltages of the plurality of electricity accumulating means detected by the voltage monitoring means, and may set, as the first electricity accumulating block, electricity accumulating means in which a voltage difference with the mean voltage is equal to or greater than a first predetermined voltage.

Furthermore, the selection means may set, as the second electricity accumulating block, electricity accumulating means in which a voltage difference with the mean voltage is equal to or less than a second predetermined voltage.

Moreover, the connection switching means may perform the switch of the first and second connection modes reiteratedly once or a predetermined number of times.

It is preferable that the selection means select a subsequent electricity accumulating block when the switch of the first and second connection modes by the connection switching means has been performed the predetermined number of times, and it is also preferable that the selection of the subsequent electricity accumulating block by the selection means and the switch of the first and second connection modes by the connection switching means be reiteratedly executed.

Furthermore, the selection means may have voltage monitoring means to monitor respective voltages of the plurality of electricity accumulating means, and based on the voltages detected by the voltage monitoring means, the selection means may set the plurality of electricity accumulating blocks and also selects two electricity accumulating blocks from among the set plurality of electricity accumulating blocks.

The selection means may compute a mean voltage value of the voltages of the plurality of electricity accumulating means detected by the voltage monitoring means. When the voltages of all electricity accumulating means within the first and second electricity accumulating blocks with respect to the mean voltage are caused to be within a third predetermined voltage difference by the switch of the first and second connection modes performed by the connection switching means, the selection means may end the switch of the first and second connection modes performed by the connection switching means and selects a subsequent electricity accumulating block, and the selection of the subsequent electricity accumulating block by the selection means and the switch of the first and second connection modes by the connection switching means may be reiteratedly executed.

BRIEF DESCRIPTION OF THE DRAWINGS

The present invention will be described in further detail with reference to the accompanying drawings wherein.

DETAILED DESCRIPTION OF THE PREFERRED EMBODIMENTS

An embodiment of the present invention will hereinafter be described in detail in reference to the drawings. FIGS. 1 through 4 show an electricity accumulator constituted in accordance with one embodiment of the present invention.

Figure 1:
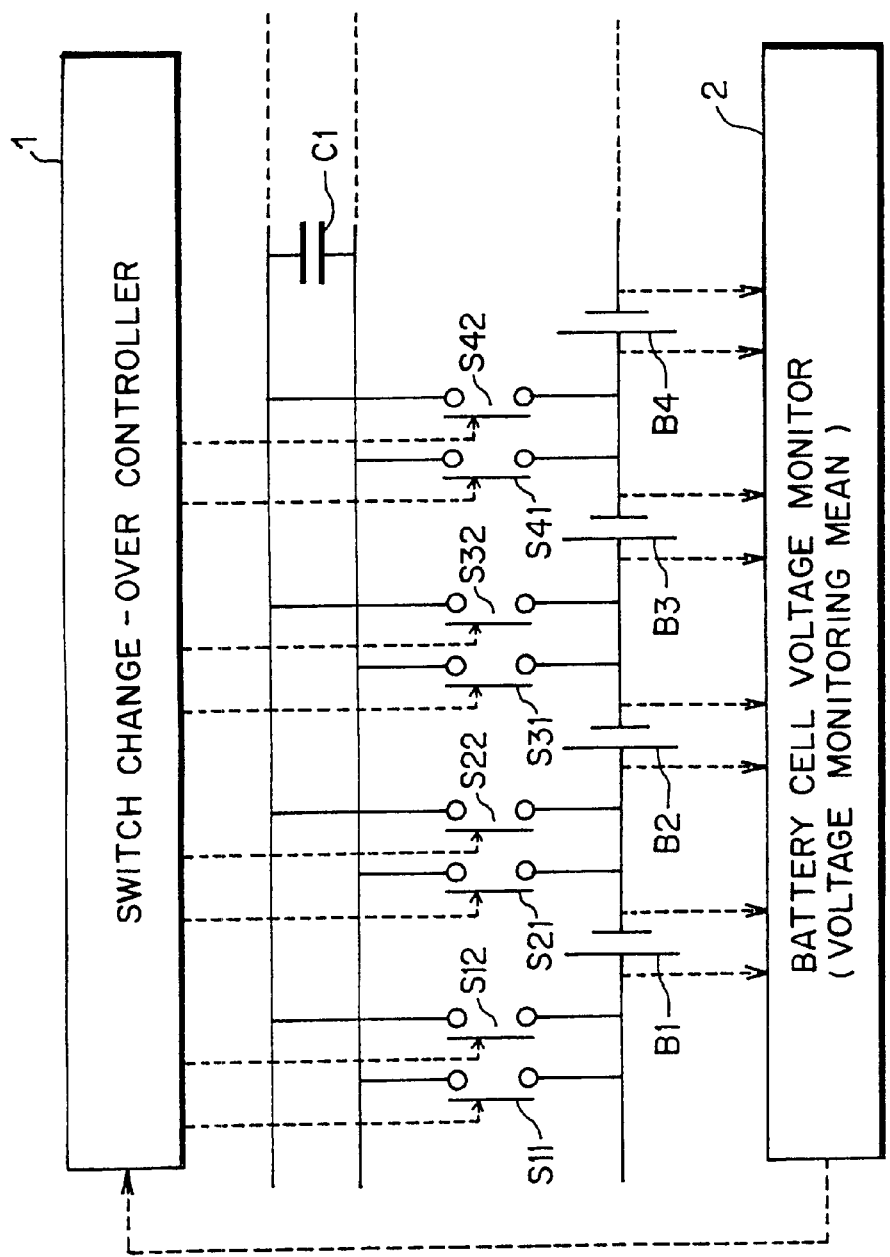
FIG. 1 is a circuit diagram showing the essential constitution of an electricity accumulator according to an embodiment of the present invention.

As shown in FIG. 1, the electricity accumulator in this embodiment is constituted as a storage battery comprising a plurality of battery cells (electricity accumulating means) B1, B2, B3, B4, . . . connected in series.

The electricity accumulator in this embodiment is particularly applicable to a storage battery (comprising a plurality of battery cells connected in series) that is employed as a power supply for an electric automobile, and is constituted as a storage battery comprising tens of battery cells connected in series.

In FIG. 1, although four battery cells alone are shown for reasons of the drawing, a large number of battery cells (not shown) are further connected, and in total, tens of battery cells are connected in series.

The electricity accumulator in this embodiment, however, is not particularly limited to the number of battery cells (electricity accumulating means) constituting a storage battery.

Switches are connected two by two to each terminal of the battery cells (electricity accumulating means) B1, B2, B3, B4, . . . More specifically, as shown in FIG. 1, (1) one end of each of the switches S11 and S12 is connected to the positive terminal of the battery cell B1, (2) one end of each of the switches S21 and S22 is connected to the negative terminal of the battery cell B1 (i.e., the positive terminal of the battery cell B2), (3) one end of each of the switches S31 and S32 is connected to the negative terminal of the battery cell B2 (i.e., the positive terminal of the battery cell B3), and (4) one end of each of the switches S41 and S42 is connected to the negative terminal of the battery cell B3 (i.e., the positive terminal of the battery cell B4). Likewise, switches are also connected for the terminals of battery cells (not shown).

Such switches S11, S12 to S41, S42, . . . are all on-off switches. Among the switches S11, S12 to S41, S42, . . . , the other end of each of the switches S11, S21, S31, S41, . . . is connected to one end of a capacitor C1, while the other end of each of the switches S12, S22, S32, S42, . . . is connected to the other end of the capacitor C1. And in order to perform on-off control of these switches S11, S12 to S41, S42, . . . , a switch change-over controller 1 is equipped.

In addition, a battery cell voltage monitor 2 is equipped as a means of monitoring the terminal voltages of the battery cells B1, B2, B3, B4, . . . The terminal voltage information on the battery cells B1, B2, B3, B4, . . . , obtained by this battery cell voltage monitor 2, is transmitted to the switch change-over controller 1.

The switch change-over controller 1 can connect an arbitrary switch of the switches S11, S12 to S41, S42, . . . But in this embodiment, the switch change-over controller 1 performs a switch change-over process for performing voltage equalization between a battery cell whose voltage is highest and a battery cell whose voltage is lowest, based on the voltage information from the battery cell voltage monitor 2.

More specifically, with the switch change-over process in the switch change-over controller 1, a battery cell whose voltage is highest and the capacitor C1 are first connected in parallel (such a connection state is referred to as a first connection mode). Then, after the parallel connection between the battery cell whose voltage is highest and the capacitor C1 is cut off, a battery cell whose voltage is lowest and the capacitor C1 are connected in parallel (such a connection state is referred to as a second connection mode). Thereafter, the parallel connection between the battery cell whose voltage is lowest and the capacitor C1 is cut off.

Note that it is a matter of course that if the positive terminal of a battery cell is connected to one end of the capacitor C1 in connecting the battery cell to the capacitor C1 in parallel, the negative terminal of the battery cell is connected to the other end of the capacitor C1.

If the aforementioned switch change-over process is performed, in the first connection mode a high voltage will be applied to the capacitor C1 and therefore a large amount of electric charge corresponding to this high voltage will be accumulated. In the second connection mode, the voltage which is applied to the capacitor C1 becomes lower than that in the first connection mode, and the electric charge corresponding to this voltage drop is transferred to a battery cell whose voltage is lowest. Therefore, if the first connection mode and the second connection mode are reiterated, electric charge will be transferred from a battery cell whose voltage is highest to a battery cell whose voltage is lowest, whereby voltage equalization will be performed between these battery cells.

In the switch change-over controller 1 of this embodiment, at each point of time in predetermined cycles a battery cell whose voltage is highest and a battery cell whose voltage is lowest are selected, and the selected battery cells are connected in parallel with the capacitor C1. Then, by executing the first and second connection modes, between the selected battery cells an electric charge is transferred from the battery cell whose voltage is high to the battery cell whose voltage is low, whereby voltage equalization is performed between the battery cells.

Note that within one cycle, the first connection mode and the second connection mode may be reiterated a predetermined number of times, or the first connection mode and the second connection mode may be performed once, respectively.

In either case, by the parallel connection between the battery cells and the capacitor C1 in the first and second connection modes, voltage equalization is performed between a battery cell whose voltage was highest at that time and a battery cell whose voltage was lowest at that time.

Note that the switches (connection switching means) S11, S12 to S41, S42, . . . may be constituted with mechanical switches S11 to S14. From the standpoint of controllability or durability, they may also be constituted by semiconductor switching means (semiconductor switch) such as semiconductor transistors.

Since the electricity accumulator as one embodiment of the present invention is constituted as described above, the following operation is performed.

That is, in the switch change-over controller 1, a battery cell whose voltage is highest and a battery cell whose voltage is lowest are selected in cycles from among a plurality of battery cells, based on the voltage information from the battery cell voltage monitor 2 as voltage monitoring means, and between the selected battery cell whose voltage is highest and battery cell whose voltage is lowest, the switch change-over process for voltage equalization is carried out.

Figure 2:
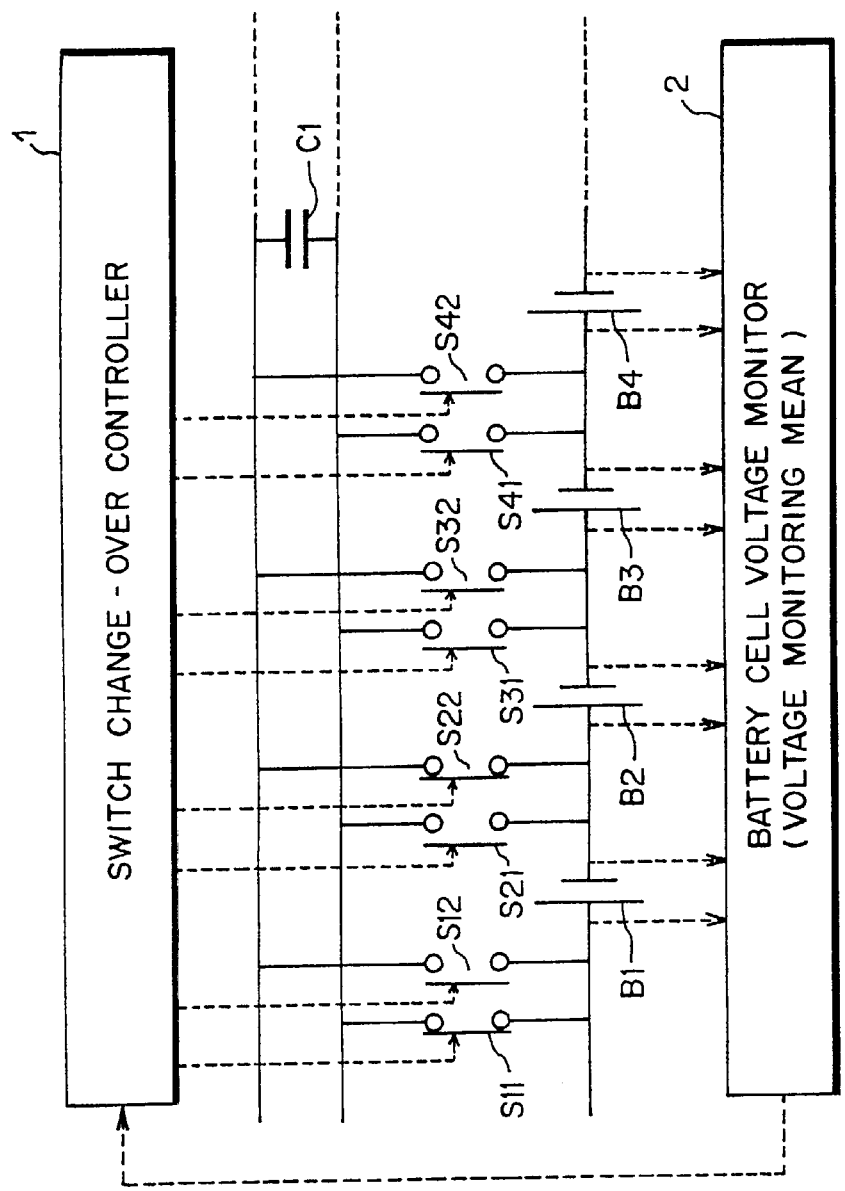
FIG. 2 is a circuit diagram corresponding to FIG. 1 for explaining how the electricity accumulator shown in FIG. 1 is operated, an operating state different from that shown in FIG. 1 having been shown.

For instance, in the case where in a certain processing cycle the voltage V1 of the battery cell B1 is highest and also the voltage V3 (V3<V1) of the battery cell B3 is lowest, the switches S11 and S22 are first turned on so that the positive terminal of the battery cell B1 is connected to one end (lower terminal in FIGS. 1 through 3) of the capacitor C1 and also the negative terminal of the battery cell B1 is connected to the other end (upper terminal in FIGS. 1 through 3) of the capacitor C1, as shown in FIG. 2 (first connection mode).

If, as in the first connection mode, the capacitor C1 and the battery cell B1 are connected in parallel, the voltage of the battery cell B1 and the voltage across the capacitor C1 will be both V1'. This V1' is voltage ($=V1-v_1$) lower than V1 by $v_1$ corresponding to the electric charge which flowed from the battery cell B1 into the capacitor C1.

Figure 3:
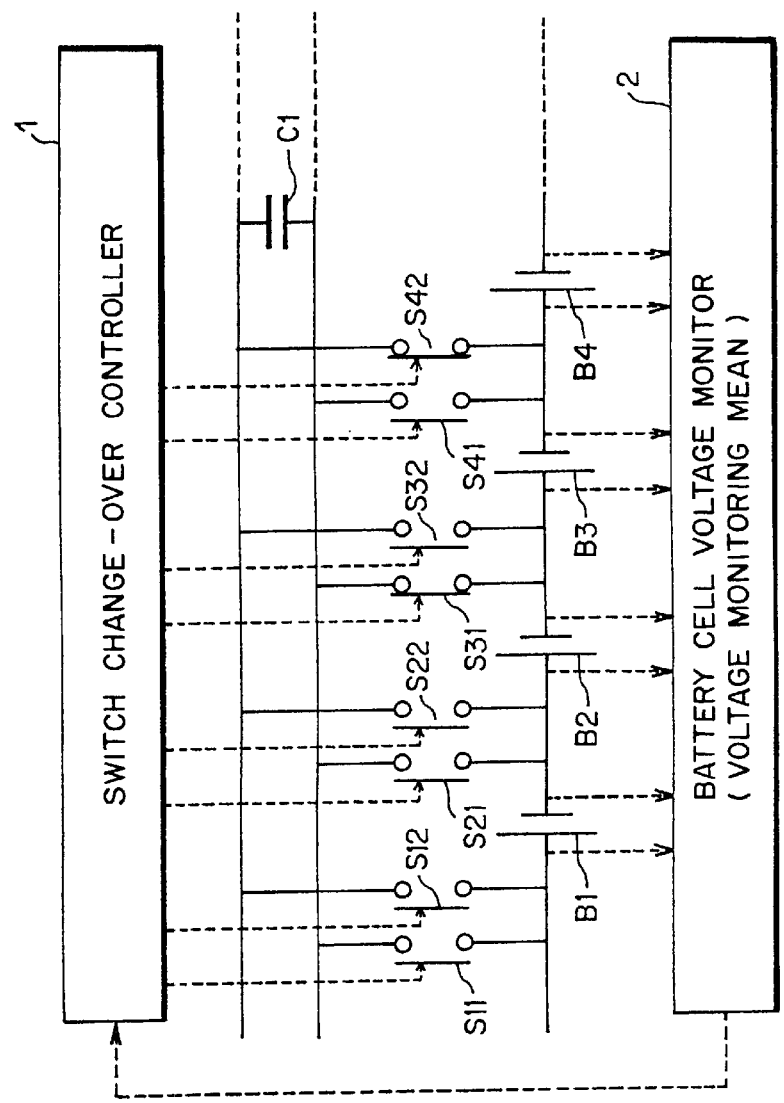
FIG. 3 is a circuit diagram corresponding to FIGS. 1 and 2 for explaining how the electricity accumulator shown in FIG. 1 is operated, an operating state different from those shown in FIGS. 1 and 2 having been shown.

Next, after the switches S11 and S22 are turned off as shown in FIG. 1, the switches S31 and S42 are turned on so that the positive terminal of the battery cell B3 is connected to one end of the capacitor C1 and the negative terminal of the battery cell B3 to the other end of the capacitor C1, as shown in FIG. 3 (second connection mode).

If, as in the second connection mode, the capacitor C1 and the battery cell B3 are connected in parallel, the voltage of the battery cell B3 and the voltage across the capacitor C1 will be both V3'. This V3' is voltage ($=V3+v_3$) higher than V3 by $v_3$ corresponding to the electric charge that flowed from the capacitor C1 into the battery cell B3.

At the end of the second connection mode, the switches S31 and S42 are also returned to an OFF state (cut-off state), as shown in FIG. 1.

In the aforementioned manner, electric charge is transferred from the battery cell B1 to the battery cell B3 through the capacitor C1 so that the voltage of the battery cell B1 decreases from V1 and also the voltage of the battery cell B3 increases from V3. As a consequence, the voltage difference between the battery cells B1 and B3 decreases.

If the control of switches in the first connection mode and the control of switches in the second connection mode are performed a predetermined number of times or once between the battery cells B1 and B3, similar switch control will be performed in a subsequent processing cycle. That is, in the switch change-over controller 1, a battery cell whose voltage is highest and a battery cell whose voltage is lowest are selected again from among a plurality of battery cells, based on the voltage information from the battery cell voltage monitor 2.

In the subsequent processing cycle, the voltage of the battery cell B1 has decreased and the voltage of the battery cell B3 has increased, but, if the increase or decrease in these voltages is small, there will be a possibility that the battery cell B1 will be selected as a battery cell whose voltage is highest or that the battery cell B3 will be selected as a battery cell whose voltage is lowest. However, as compared with the previous processing cycle, at least the aforementioned battery cell B1 whose voltage is highest has decreased and at least the aforementioned battery cell B3 whose voltage is lowest has increased.

And as with the above-mentioned switch control, by performing the switch control in the first connection mode and the switch control in the second connection mode a predetermined number of times or once between the newly selected battery cell whose voltage is highest and the newly selected battery cell whose voltage is lowest, voltage equalization is performed between these battery cells. As a consequence, as compared with the previous processing cycle, the battery cell whose voltage is highest has likewise decreased and the battery cell whose voltage is lowest has likewise increased.

Therefore, if the aforementioned process is reiterated, voltage equalization will be efficiently performed between a plurality of battery cells, whereby quick voltage equalization will be performed between a plurality of battery cells.

Particularly, when the voltage difference between two battery cells is large, the movement of electric change from the battery cell to the capacitor C1 is quickly performed and the voltage equalization between two battery cells by movement of electric charge is performed in a short time, so that voltage equalization is efficiently performed.

In the above-mentioned embodiment, while it has been described as the simplest example that in each processing cycle the voltage equalization is performed between two battery cells, a battery cell whose voltage is highest and a battery cell whose voltage is lowest, the voltage equalization may be simultaneously performed between three or more battery cells.

For instance, it is conceivable that a mean voltage of all battery cells is computed and that between a first battery cell group (a single battery cell or a plurality of battery cells, i.e., an electricity accumulating block) in which the difference with the mean voltage is equal to or greater than a predetermined voltage and a second battery cell group (electricity accumulating block) in which the difference with the mean voltage is less than the predetermined voltage, the voltage equalization is performed at the same time. In such a case, the switch change-over controller 1 is equipped with a function (selection means) of setting a plurality of battery cell groups (electricity accumulating blocks) and then selecting two battery cell groups (electricity accumulating blocks) from the set plurality of battery cell groups (electricity accumulating blocks).

In the above case, initially all battery cells of the first battery cell group in which the difference with the mean voltage is equal to or greater than a predetermined voltage are concurrently connected in parallel with the capacitor C1 so that the capacitor C1 is charged (first connection mode). Then, after the first connection is released, all battery cells of the second battery cell group in which the difference with the mean voltage is less than the predetermined voltage are concurrently connected in parallel with the capacitor C1 so that discharging is performed from the capacitor C1 to all the battery cells of the second battery cell group voltage (second connection mode). In this manner, electric charge is moved from the battery cells whose voltage is high to the battery cells whose voltage is low, so that voltage equalization can be performed at the same time between a large number of battery cells (three or more battery cells) and there is an advantage that voltage equalization can be more quickly performed between a large number of battery cells.

In addition, if the voltage equalizing process is set so that it ends when the voltage differences between the voltages of all battery cells and the mean voltage of all battery cells are all within a predetermined value (very small value), then the voltage equalizing process can be more efficiently performed. Of course, if the voltage difference between any voltage of the battery cells and the mean voltage becomes equal to or greater than the predetermined value (very small value) with further use of the storage battery, then voltage equalizing process may be performed, for example, between battery cells with the largest voltage difference.

Thus, in the electricity accumulator of this embodiment, an arbitrary battery cell can be selected from among a plurality of battery cells (electricity accumulating means) and connected to a capacitor to perform the voltage equalizing process between the battery cells. Therefore, if the voltage equalizing process is performed by selecting battery cells appropriately, it can be performed with extremely high efficiency.

In addition, as the charge moving component is only a single balancing capacitor, there is an advantage that the overall circuit can be reduced in size and cost.

Incidentally, the battery cell according to the electricity accumulator of this embodiment is constituted, for example, by a lithium-ion battery cell. As in the characteristic of the lithium-ion battery cell shown in FIG. 4, the voltage is determined in dependence to the discharge amount. Conversely speaking, it may safely be said that the battery cell voltage is determined in dependence to the charge amount (condensed amount). Therefore, the battery cell voltage is adjusted to a desired discharge amount, i.e., charge amount (condensed amount) by the aforementioned voltage equalization.

Figure 4:
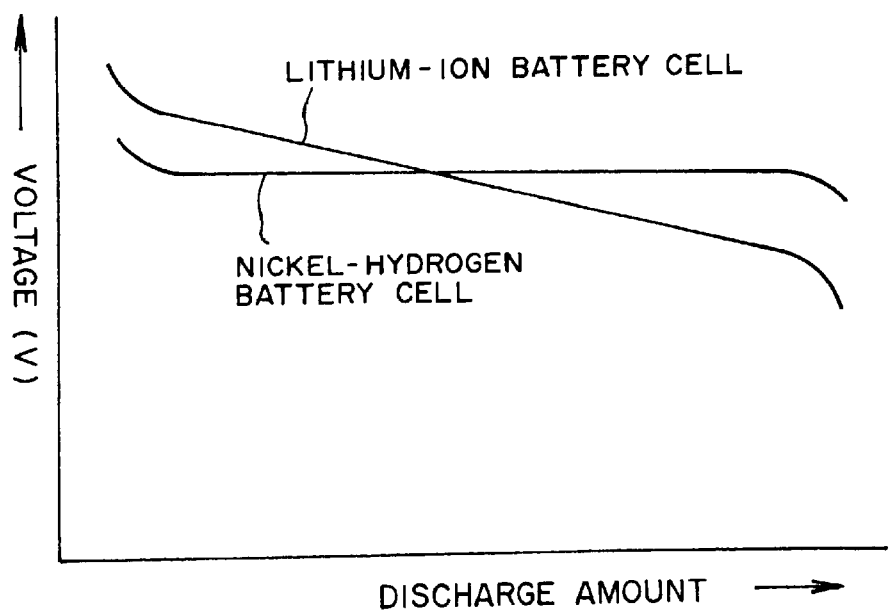
FIG. 4 is a graph showing the characteristic of a battery cell provided in the electricity accumulator of FIG. 1.
Figure 5:
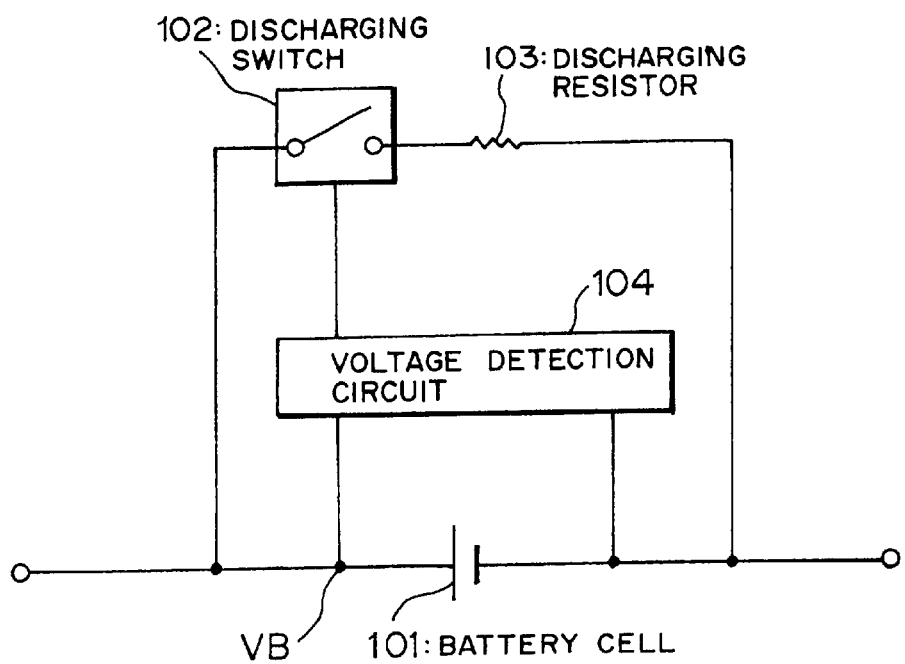
FIG. 5 is a schematic circuit diagram showing a conventional electricity accumulator.

As in the characteristic of a nickel-hydrogen battery cell shown in FIG. 4, in a battery cell with a flat characteristic in which its voltage does not vary linearly with its discharge amount, the discharge amount (or charge amount) is not caused to be in a desired state by voltage equalization. However, as in the above-mentioned lithium-ion battery cell, in a battery cell in which the voltage varies linearly with the discharge amount (or charge amount), the discharge amounts (or charge amounts) of battery cells constituting a storage battery are uniformed into a desired state, so the performance of such a battery cell (e.g., a lithium-ion battery cell) can be sufficiently utilized.

Of course, in the electricity accumulator of this embodiment, the voltages of battery cells B1, B2, B3, B4, . . . are equalized with one another by moving electric charge through the capacitor C1, so there is no component which generates a large amount of heat, and equalization is realized, while energy loss due to heat generation is being avoided.

Additionally, the operation of the equalization is not limited to a period during which a storage battery is fully charged, but it can be performed in all states independently of operating states such as traveling, charging, discharging, etc. Therefore, the operation of the equalization can be performed even during discharge or when a battery is not in use. Of course the storage battery in this embodiment can be utilized in electric automobiles which are not charged to its full charge during travel while generating electrical energy, as in hybrid electric automobiles.

Note that in the case where such a circuit is actually applied, it is necessary that the circuit operate efficiently and reliably and have good durability. Considering such specific conditions, it is preferable that the switches S11, S12, S21, S22, . . . use power devices whose switching gross is as small as possible (e.g. FETs and IGBTs) and it is also preferable that the switch change-over controller 1 be equipped with a circuit which is automatically caused to change over the switches S11, S12, S21, S22, . . . by an external oscillator.

Also, if a capacitor with a relatively large capacitance, such as an electric double layer capacitor, is employed in the capacitor C1, quick voltage equalization can be performed. But, if voltage equalization is always or frequently performed, a capacitor with a small capacitance can be sufficiently employed to equalize charge quantities by voltage equalization.

Furthermore, it is conceivable that a circuit for preventing current from rushing into the capacitor C1 and an initial charging circuit are also necessary.

In addition to the aforementioned switch change-over operation, it is also conceivable that the switch change-over controller 1 is combined with various methods, such as a method of interlocking a switch for maintenance and the switches S11, S12, S21, S22, . . . and driving them in the case of necessity by an external voltage measuring circuit, a method of performing a voltage equalizing process (in which the switches S11, S12, S21, S22, . . . are selected and connected properly) when a vehicle is not in use, a method of performing the voltage equalizing process at predetermined intervals with a timer circuit, and a method of performing the voltage equalizing process when equalization is indicated by a circuit for controlling electrical load to be connected (in the case of electric automobiles, a motor controller or a residual capacitance meter).

Furthermore, even if an isolating transformer or a battery cell is employed instead of the capacitor C1, almost similar advantages can be obtained.

The electricity accumulator of the present invention is also applicable to a set capacitor in which capacitors are employed as electricity accumulating means instead of employing battery cells. That is, the present invention may be applied to a set capacitor comprising a plurality of capacitors connected in series instead of being applied to a storage battery comprising a plurality of battery cells connected in series.

And if the above-mentioned structure is adopted in storage batteries or electric double layer capacitors in which various disadvantages tend to occur due to battery cell voltage fluctuation when a plurality of battery cells or a plurality of capacitors are combined together and if a voltage equalizing circuit is constituted, a system for performing voltage equalization at all times without the occurrence of great energy loss can be realized.

A method which does not operate the circuit of the present invention at all times but performs voltage equalization as needed by a battery cell voltage monitor, etc., can be embodied.

Particularly, by applying the circuit of the present invention to a lithium-ion battery cell, the capability of the lithium-ion-battery cell can be utilized 100 percent, and therefore, safety can be easily ensured.

Note that if the speed at which the connection mode is switched by the control means is varied when the voltage equalizing process shifts from the case of a large voltage difference being present between battery cells to the case of a small voltage difference, the time required for voltage equalization can also be shortened.

While the present invention has been described with reference to preferred embodiments thereof, the invention is not to be limited to the details given herein, but may be modified within the scope of the appended claims.

What is claimed is:

1. An electricity accumulator comprising:
   a plurality of electricity accumulating means connected in series;
   selection means to partition said plurality of electricity accumulating means into a plurality of electricity accumulating blocks and select two electricity accumulating blocks from among said plurality of electricity accumulating blocks, each electricity accumulating block being constituted by one electricity accumulating means or a plurality of electricity accumulating means;
   a capacitor provided so that it is connectable in parallel with an arbitrary block of said plurality of electricity accumulating blocks; and
   connection switching means to switch selectively a first connection mode in which said capacitor is connected to a first electricity accumulating block of said two electricity accumulating blocks selected by said selection means so that part of the electric power of said first electricity accumulating block is transferred to said capacitor and a second connection mode in which said capacitor is connected to a second electricity accumulating block differing from said first electricity accumulating block so that said second electricity accumulating block is charged;
   wherein the selection of said two electricity accumulating blocks by said selection means and the switch of said first and second connection modes by said connection switching means are repeatedly performed.

2. The electricity accumulator as set forth in claim 1, wherein said capacitor is connectable in parallel with all electricity accumulating means of said electricity accumulating block which becomes an object of selection, selected by said selection means.

3. The electricity accumulator as set forth in claim 2, wherein said selection means has voltage monitoring means to monitor respective voltages of said plurality of electricity accumulating means and, based on said voltages detected by said voltage monitoring means, said selection means sets said plurality of electricity accumulating blocks and also selects two electricity accumulating blocks from among the set plurality of electricity accumulating blocks.

4. The electricity accumulator as set forth in claim 3, wherein:

said selection means computes a mean voltage value of the voltages of said plurality of electricity accumulating means detected by said voltage monitoring means;

when the voltages of all electricity accumulating means within said first and second electricity accumulating blocks with respect to said mean voltage are caused to be within a third predetermined voltage difference by the switch of said first and second connection modes performed by said connection switching means, said selection means ends said switch of said first and second connection modes performed by said connection switching means and selects a subsequent electricity accumulating block; and the selection of said subsequent electricity accumulating block by said selection means and the switch of said first and second connection modes by said connection switching means are reiteratedly executed.

5. The electricity accumulator as set forth in claim 1, wherein said selection means has voltage monitoring means to monitor respective voltages of said plurality of electricity accumulating means and, based on said voltages detected by said voltage monitoring means, said selection means sets said plurality of electricity accumulating blocks and also selects two electricity accumulating blocks from among the set plurality of electricity accumulating blocks.

6. The electricity accumulator as set forth in claim 5, wherein said selection means sets as a single electricity accumulating block a plurality of electricity accumulating means in which said voltages detected by said voltage monitoring means are within a predetermined range.

7. The electricity accumulator as set forth in claim 6, wherein said selection means computes a mean voltage value of the voltages of said plurality of electricity accumulating means detected by said voltage monitoring means, and sets, as said first electricity accumulating block, electricity accumulating means in which a voltage difference with said mean voltage is equal to or greater than a first predetermined voltage.

8. The electricity accumulator as set forth in claim 7, wherein said selection means sets, as said second electricity accumulating block, electricity accumulating means in which a voltage difference with said mean voltage is equal to or less than a second predetermined voltage.

9. The electricity accumulator as set forth in claim 1, wherein said selection means has voltage monitoring means to monitor respective voltages of said plurality of electricity accumulating means and sets, as a single electricity accumulating block, single electricity accumulating means in which said voltage detected by said voltage monitoring means is in a predetermined state.

10. The electricity accumulator as set forth in claim 9, wherein electricity accumulating means in which said voltage detected by said voltage monitoring means is in a highest voltage state is set as said first electricity accumulating block from among said plurality of electricity accumulating means by said selection means.

11. The electricity accumulator as set forth in claim 10, wherein electricity accumulating means in which said voltage detected by said voltage monitoring means is in a lowest voltage state is set as said first electricity accumulating block from among said plurality of electricity accumulating means by said selection means.

12. The electricity accumulator as set forth in claim 1, wherein said connection switching means performs the switch of said first and second connection modes reiteratedly once or a predetermined number of times.

13. The electricity accumulator as set forth in claim 12, wherein said selection means selects a subsequent electricity accumulating block when the switch of said first and second connection modes by said connection switching means has been performed said predetermined number of times and wherein the selection of said subsequent electricity accumulating block by said selection means and the switch of said first and second connection modes by said connection switching means are reiteratedly executed.

* * * * *